US005338451A

United States Patent [19]

Lindberg et al.

[11] Patent Number: 5,338,451

[45] Date of Patent: Aug. 16, 1994

[54] APPARATUS FOR TREATING PULP

[75] Inventors: Pentti Lindberg; Risto Ljokkoi, both of Karhula, Finland

[73] Assignee: A. Ahlstrom Corporation, Noormarkku, Finland

[21] Appl. No.: 33,319

[22] Filed: Mar. 15, 1993

[30] Foreign Application Priority Data

Mar. 13, 1992 [FI] Finland ................................. 921085

[51] Int. Cl.[5] ............................................ B01D 35/28

[52] U.S. Cl. .................................... 210/405; 210/415; 162/55; 162/242; 100/117

[58] Field of Search ............... 210/405, 413, 414, 415; 162/55, 242, 18; 100/117

[56] References Cited

U.S. PATENT DOCUMENTS 3,230,865 1/1966 Hibbel et al. ....................... 210/415
3,616,932 11/1971 Bancroft .
3,947,314 3/1976 Chupka et al. .
4,160,722 7/1979 Marsh .

FOREIGN PATENT DOCUMENTS 0034780 12/1986 Fed. Rep. of Germany .
85995 3/1942 Finland .

*Primary Examiner*—Frank Spear
*Assistant Examiner*—David Reifsnyder
*Attorney, Agent, or Firm*—Cohen, Pontani, Lieberman, Pavane

[57] ABSTRACT

An apparatus for treating pulp includes an outer casing, a stationary screen surface mounted in the outer casing. A conduit introduces pulp into the interior of the screen surface. An annular space is defined between the screen surface and the casing for receiving the fraction passing through the screen surface. A feed screw is rotatably mounted in the interior of the screen surface. The feed screw extends vertically or is to some extent inclined relative to the vertical direction. The feed screw includes a shaft and pulp conveying blades. The periphery of the feed screw is provided with a nozzle conduit extending substantially parallel to the shaft and located close to the screen surface for spraying washing liquid to the screen surface. The apparatus is especially suitable for screening and/or thickening of fiber suspensions in the wood processing industry.

11 Claims, 3 Drawing Sheets

APPARATUS FOR TREATING PULP

BACKGROUND OF THE INVENTION

1. Field of the Invention

The present invention relates to an apparatus for treating pulp. The apparatus is especially suitable for screening fiber suspensions in the wood processing industry and/or for thickening. In other words, the apparatus is used where either fibers, liquid or both are to be removed from fiber suspensions. Specifically, the apparatus in accordance with the present invention may be used, for example, for the treatment of reject from a paper machine or for knot separation subsequent to the blow tank in pulp digestion.

2. Description of the Related Art

The present invention is based on a so called Stocker screw, which is described, for example, in U.S. Pat. Nos. 3,947,314 and 4,160,722. Also, EP Patent 0 034 780 shows an apparatus of this type. Thus, an apparatus in accordance with the prior art has an upright or a slightly inclined shaft and an evenly ascending, continuous screw thread mounted on the shaft. The screw thread is used for upwardly conveying the material to be treated, which is introduced into the lower end of the apparatus. In addition, in the known apparatus, the screw thread is surrounded by a screen surface through which the accepted material is discharged from the lower end of the apparatus and the material rejected to the inside of the screen surface is discharged from the upper end of the apparatus. Furthermore, the apparatus is frequently used as a so called knot washer; in other words, the apparatus is used for separating fibers and fiber flocs entrained with the knots and like larger solid particles of the fiber suspension and accepting them through the screen surface. During this accepting process, the knot material is also dewatered, so that the consistency of the rejected material quickly increases. The purpose is to raise the consistency as high as possible, because the knot material discharged from the apparatus is mostly incinerated. Thereby, the water content of the pulp should, of course, be as low as possible. The consistency is limited in practice by the fact that, although all of the loose liquid in the pulp is removed, so much liquid is absorbed in the knots and like particles that the consistency will be only 30%.

An apparatus known from U.S. Pat. No. 3,616,932 includes means mounted to a helical flight of the screw feeder for feeding washing liquid to the screen surface. The means are formed, according to one embodiment, by a tube mounted to the periphery of the flight on the discharge side of the screw. The tube is provided with perforations through which the washing liquid is injected to the screen surface. However, this embodiment is not advantageous because, firstly, the manufacture of the apparatus is very difficult and, secondly, most of the liquid fed through the spiral tube will be used for the dilution of the pulp. By using the spiral pipe, it may be ensured that the liquid supply takes place homogeneously throughout the whole screen surface, which probably has been the objective of the construction, but practice has proved that this arrangement also has some disadvantages. Since the pitch of the screw is relatively small, the pitch of the helical tube is also small. However, washing liquid must be injected to the screen surface so that the washing jet hits each of the perforations in the screen surface. Therefore, the spiral tube must be provided with a rather dense network of feed perforations. A rather high amount of liquid is supplied to the screen surface, which results in a liquid film flowing on both sides of the screen surface, so that the consistency of the pulp to be treated is considerably diluted, especially on the upper part of the apparatus, in which part the apparatus is used to achieve the maximum consistency. However, so much liquid has to be fed in, in order to maintain the screen surface clean, that it flows downwards along the whole of the screen surface.

Further, the use of a continuous screw brings about problems, because the pulp to be treated tends to move as a uniform plug in an apparatus, such that the consistency thereof close to the shaft of the apparatus remains relatively small, whereas the consistency close to the screen surface may become very high.

A second arrangement worth mentioning is one in which it is an object not so much to wash the screen surface, but to dilute the reject material remaining inside the screen surface of the apparatus so as to wash off usable fibrous material from the material to be rejected and to allow it to be discharged through the perforations of the screen surface to the accept side. In this prior art arrangement, the dilution liquid is fed directly from the shaft, so that the dilution effect thereof is not directed to where it should be, in other words, to the thickened pulp layer, which is naturally located in close proximity to the screen surface.

However, the capacity of the prior art apparatuses is relatively small, because they tend to clog rather easily. It is clear that, in an apparatus which has a thread homogeneously conveying the suspension upwards and in which it is possible contemporarily to remove liquid for thickening and to remove fibers for screening, the flow takes place merely towards the screen surface, so that the openings thereof, of course, clog quickly. Further, it must be noted that the consistency of the suspension fed into the apparatus is at its lowest close to the shaft and increases to a maximum when approaching the screen surface. Thus, the clogging of the screen surface occurs also because of the increase of the consistency towards the screen surface, and the fibers which are already loose from the knots form a fiber matting on the screen surface. The sticking of fibers, fiber flocs and fiber matting on the openings of the screen surface is further caused by a grinding effect of the screw, by which the screw tends to remove the thickest fiber accumulations from the screen surface. At the same time as the screw scrapers off fiber matting from the surface, it presses a portion of the matting deeper into the openings of the screen surface. All the operations of the screw on the material to be treated are very gentle and continuous, so that the fiber matting does not tend to break, the flocs formed by the fibers do not break and the consistency of the material is not homogeneous. This is because the material rises in the tube defined by the screen surface practically as one uniform column.

As can be appreciated from the above, the greatest defect in the apparatuses in accordance with the prior art is their small capacity, which is due to the clogging of the screen surface.

SUMMARY OF THE INVENTION

Therefore, it is the object of the present invention to provide an apparatus of the type described above in which clogging of the screen surface is prevented, so that the capacity thereof is increased as compared to prior art apparatus.

In accordance with the present invention, the apparatus for treating pulp includes an outer casing, a stationary screen surface mounted in the outer casing, a conduit for introducing pulp into the space within the screen surface, and an annular space defined between the screen surface and the outer casing for receiving the fraction of the pulp which passes the screen surface. A feed screw is rotatably mounted in the space within the screen surface. The feed screw extends substantially vertically, i.e. the feed screw extends either vertically or is to some extent inclined relative to the vertical direction. The feed screw includes a shaft and a pulp conveying means for conveying the pulp in an upward direction in the space within the screen surface and for conveying the fraction of the pulp which remains inside the screen surface to a discharge chute. The pulp conveying means may be sector-like blades. A nozzle conduit is mounted to the periphery of the feed screw. The nozzle conduit extends substantially parallel to the shaft and is located close to the screen surface and serves for spraying washing liquid onto the screen surface.

The apparatus in accordance with the present invention offers a solution to the above-described problem by producing an irregular movement of the suspension, and by subjecting the screen surface to a suction effect, by means of which the fibers stuck to the surface or the openings of the screen surface are removed. Thus, the openings remain clear and the flow through the openings is substantially greater than in the previous arrangements. Additionally, a significant aspect of the operation of the apparatus in accordance with the present invention is that washing of the screen surface takes place more efficiently than before and that the pulp to be treated is less diluted. At the same time, the consistency of the material may be homogenized by the apparatus in accordance with the present invention by shaking the material so as to mix the different parts thereof with each other.

The various features of novelty which characterize the invention are pointed out with particularly in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENT

Figure 1:
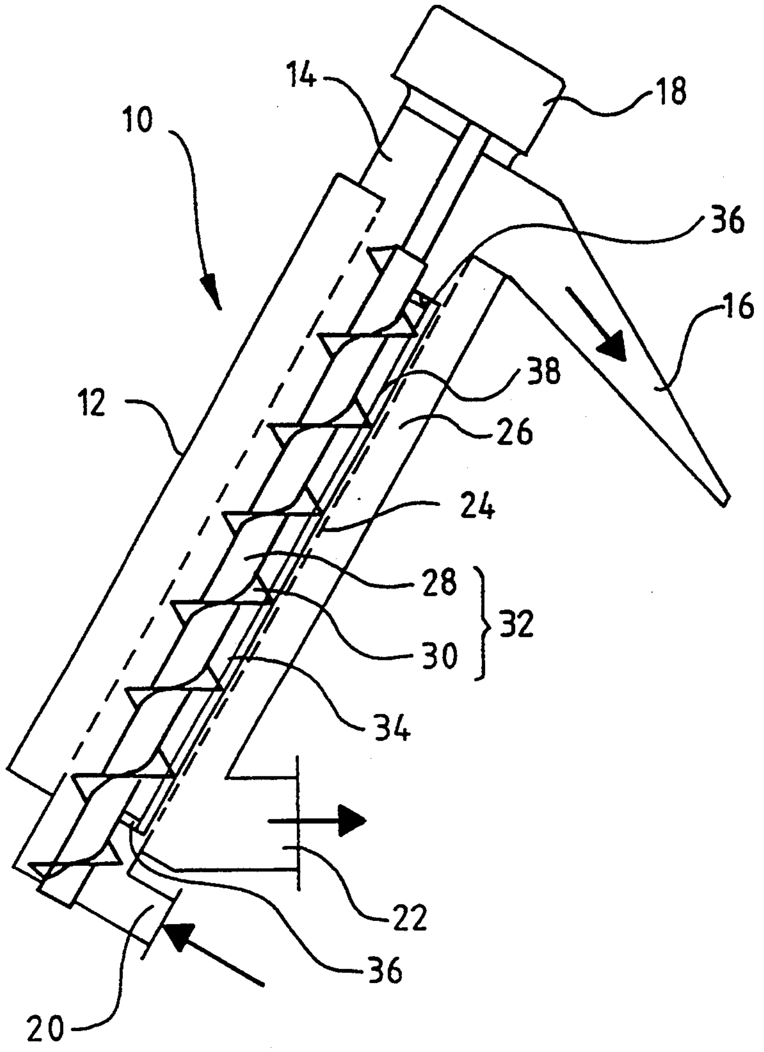
FIG. 1 is a schematic axially sectional view of the present invention.

FIG. 1 schematically illustrates a treatment apparatus 10 for pulp, which is provided with a feed apparatus for washing liquid for the screen surface 24. The illustrated apparatus, so called Stocker-apparatus, is mainly formed of an outer casing 12, which may be either cylindrical or of some other appropriate shape, a compartment 14 arranged at the upper end of the outer casing 12 and connected to a discharge chute 16 for the rejected material which extends downwardly and sideways. The upper end of the outer casing is provided with drive means 18, and a feed means 20 for the material to be treated. A discharge means 22 for the accepted material is arranged at the lower end of the outer casing. A stationary, substantially cylindrical, or in some cases conical or otherwise rotationally symmetric, screen surface 24 is arranged inside the outer casing. Thus, an oblong annular space 26 is formed between the outer casing 12 and the screen surface 24, in which the accept material accumulates after having penetrated the screen surface 24. Inside the screen cylinder 24 there is a rotatable hollow shaft 28, on which a spiral strip 30 is mounted operating as a conveyor for pulp in such a way that they together form a feed screw 32 for conveying the material fed through conduit 20 upwards. The feed screw 32 rotates at a speed determined by drive means 18 in a space 34 defined by the screen surface 24.

An additional feature of the present invention provides that a nozzle conduit 38 extending substantially parallel to the shaft 28 is attached to shaft 28 of the feed screw by means of at least two connecting pipes 36. Through the conduit 38, the washing liquid is sprayed onto the screen surface 24. Washing liquid is delivered to the nozzle conduit 38 via the hollow shaft 28 and the connecting pipes 36. The nozzle conduit 38 may be arranged as illustrated in the drawing at the periphery of a continuous thread in such a way that a recess is provided in the thread strip, to which the pipe, if so desired, is welded.

As for the position of the treatment apparatus when used, the apparatus is usually positioned to a certain extend inclined from the upright, but also a completely upright apparatus may be used. Thus, yet another feature of the apparatus provides that the axial direction thereof substantially deviates from the horizontal and is closer to the upright direction. Thus, also in this description and the accompanying claims, it has been considered to be appropriate to use the expressions "upwards" and "upper surface" without a risk of misunderstanding. The upper surface, for example, in connection with the thread, refers to the surface of the thread which pushes the material to be treated forward, in other words, upwards in the tube defined by the screen surface.

Although the operation of the apparatus is principally very simple, a short description in view of a so called knot washer is included. The material being treated, in this case fiber suspension, is fed from conduit 20 to a space 34 inside screen cylinder 24, in which space 34 the feed screw 32 conveys the suspension slowly upwards. When moving forward in space 34, fibers and liquid separate from the suspension, since they are small enough to penetrate the perforations of the screen surface 24 and are accepted into space 26, from where they are discharged through conduit 22.

The openings of the screen surface 24 are maintained clear by injecting washing liquid through openings of the nozzle conduit 38 rotatable with the screw towards the screen surface. The consistency of the suspension increases when liquid is discharged. When reaching the upper end of the screen cylinder 24, the pulp, which does not contain any loose liquid or fibers, is ready to be discharged and, depending on the destruction method, for example, to be incinerated.

Figure 2:
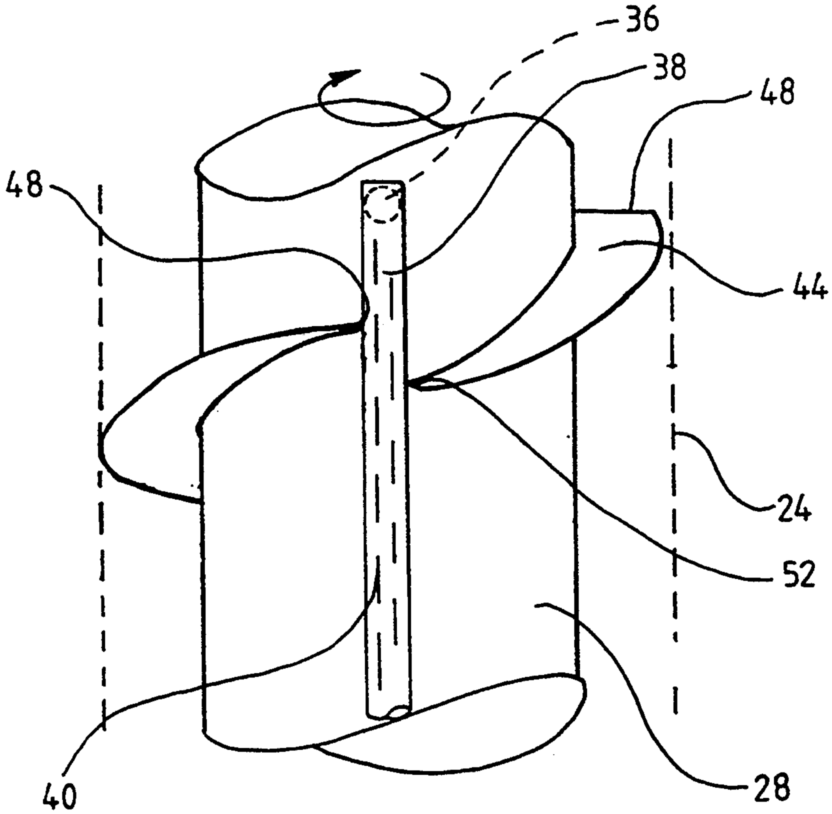
FIG. 2 is a schematic side view of an embodiment in accordance with the present invention.
Figure 3:
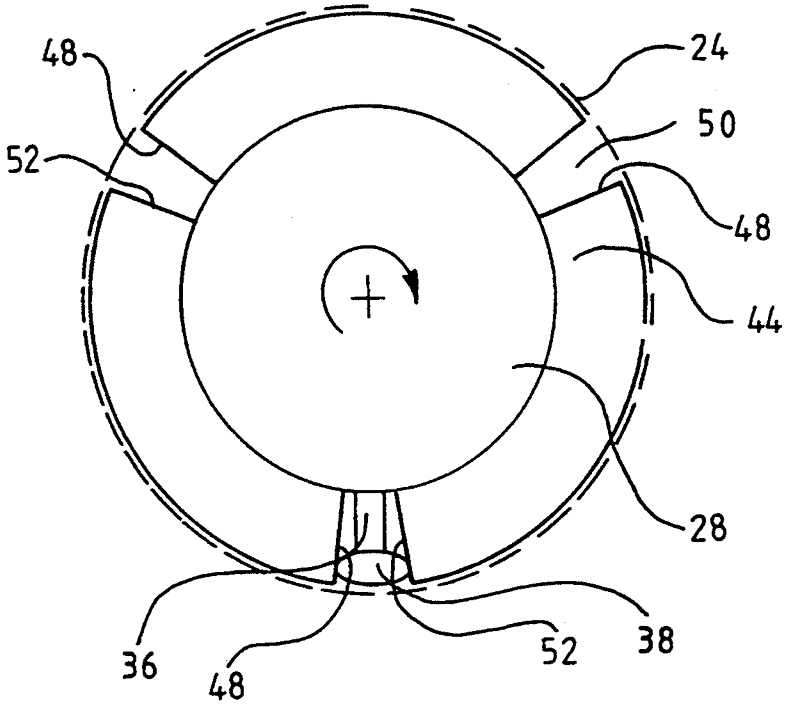
FIG. 3 is a schematic end view of the apparatus in accordance with FIG. 2.

According to FIGS. 2 and 3, the feed screw in accordance with a preferred embodiment of the invention is formed of a conventional shaft 28 and blades 44 operating as pulp conveying members attached thereto. The blades 44 are arranged on the shaft in such a way that the imaginary continuous thread formed by the trailing edges 48 thereof (the edge of the blade, over which the material falls to the next blade) substantially corresponds to the thread of the apparatus in accordance with the prior art. Blades 44 are mounted on the shaft in such a way that the average inclination thereof to the plane parallel to the shaft 28 is about 60°–75°. Blades 44 may be mounted on the shaft 28 either according to the FIG. 3, wherein the end view of the feed screw resembles, for example, a three-leaf clover. In other words, significant gaps 50 remain between blades 44, through which openings a portion of the material may fall even past the next blade. The blades may also be arranged in such a way that the leading edge 52 of each blade is located under the trailing edge 48 of the preceding blade so that the pulp particle falls directly onto the next blade. It is a feature of the construction and position of blades 44 that the pitch of the blade is considerably higher compared with the thread in accordance with prior art, so that the kinetic speed of the material in the axial direction at the blade is higher.

The blades 44 are also positioned in relation to each other in such a way that the trailing edge 48 of a blade is always higher than the leading edge of the next blade. Thus, it is ensured that the pulp is subjected to alternating axial forces in the interior of the screen surface, by which forces the fibrous accumulations are broken and the consistency of the material is homogenized. Most preferably the angle of the blade to the shaft is perpendicular. In accordance with another preferred embodiment, the angle of the blade is the same throughout the whole blade. However, the scope of the invention also includes embodiments in which the angle to some extent deviates from the described values.

FIG. 2 illustrates the nozzle conduit 38 mounted for feeding liquid to be used for washing the screen surface 24. The surface of the nozzle conduit facing the screen surface 24 is provided with slots or holes 40, through which the washing liquid is sprayed to the screen surface 24 for the washing thereof. The slots 40 are located in the embodiment of the drawing to some extent staggered so that the screen surface is equally covered by the washing liquid spray. Of course, a homogeneous spraying may be ensured also by an appropriate shaping of the slots or of the corresponding nozzle, so that the form of the spray coming from the nozzle is fan-like in the axial direction. It is also appreciated from the drawing that nozzle conduit 38 is approximately parallel to the shaft, but it may also deviate from this direction, if the circumferential length of blades 44 or the interlacing thereof so requires. When necessary, it is possible to recess the nozzle conduit 38 either to the leading or trailing edge of the blade, especially when the edges of the blades, seen from the end of the feed screw, are located closer to each other or even overlapping to some extent.

FIG. 3 illustrates that the nozzle conduit 38 may be either a conventional round tube, but also a flatter, for example, cross-sectionally elliptic, wherein the flow resistance caused by the nozzle conduit is, of course, smaller than that caused by the cylindrical duct.

Figure 4:
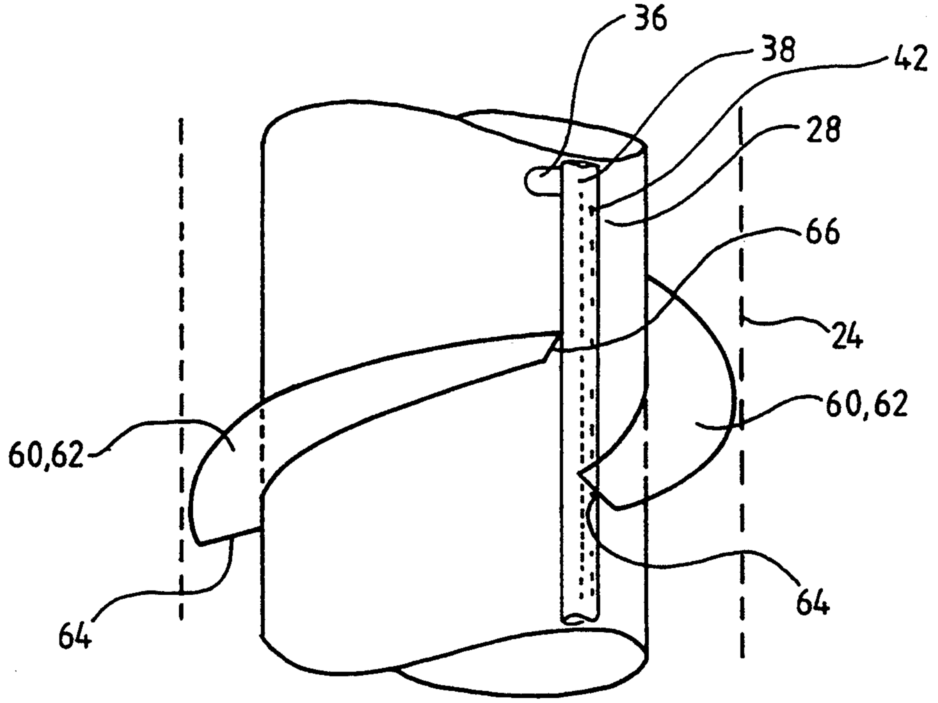
FIG. 4 schematically illustrates another embodiment of the apparatus in accordance with the present invention.

FIG. 4 illustrates yet another embodiment for a blade 60 and also for the nozzle conduit. In this embodiment, the blade 60 is manufactured of plate material and has a planar shape. In other words, a recess is cut on the edge of the blade for shaft 28, and the edge of the plate is welded to the shaft. The blade may be attached, for example (FIG. 4), in such a way that at the leading edge 64 the angle to the shaft is obtuse, i.e. more than 90°, at the middle part perpendicular, i.e. 90°, and at the trailing edge 66 of the blade acute, i.e. less than 90°. Correspondingly, the blade may be mounted also in such a way that the angle at the leading edge is perpendicular, wherefrom the angle continuously decreases towards the trailing edge. In both cases, the same function is carried out, although in the latter case more intensively, namely the blade tends to peel the material off the screen surface 24 and, due to the angled position, conveys the material towards shaft 28. The blade tends to move thick material towards the shaft, and the material of lower consistency moves towards the screen surface. At the leading edge 64 of the blade, the direction of the blade may be utilized, because in the first mentioned case when the plate is in a way inclined towards the screen surface 24, the blade 62 tends to press material towards the screen surface 24 thus intensifying the screening/thickening tendency. The same blade may also be inclined from the trailing edge 66 towards the shaft, so that it carries out the conveying of the material from the screen surface. The thick material is in a way rolled due to the change in the angle of the blade 62.

The drawing also illustrates a nozzle conduit 38 and a connecting conduit 36 between the nozzle conduit and the shaft 28. The surface of the nozzle conduit 38 is in this embodiment provided with perforations or openings 42 which operate as feed nozzles of washing liquid. The perforations 42 are preferably arranged in two or more rows and are staggered in such a way that the washing liquid sprayed therethrough is divided as homogeneously as possible on the screen surface 24.

The advantage achieved by mounting the nozzle conduit according to the invention parallel to the shaft is that the majority of the screen surface is reserved merely for thickening and/or screening without having a liquid film falling therealong as in the prior art apparatuses, which film dilutes the pulp to be thickened. By parallel to the shaft is meant in this case that the nozzle conduit is wound only once at the most around the screw, i.e. less than 360° throughout the whole length of the apparatus, whereas, for example, the length of the screw thread may even be more than ten rounds. Experiments have shown the operation of the apparatus to be ideal, wherein the screen surface of the apparatus has not clogged, but remains open.

As may be seen from the above description, the apparatus in accordance with the present invention brings about new and so far unknown operations and constructions for carrying out the operations. The invention eliminates at once the disadvantages of the apparatuses in accordance with the prior art and raises the capacity of the apparatus to a completely new level.

We claim:

1. An apparatus for treating pulp, comprising an outer casing, a stationary screen mounted within the outer casing, the screen having an interior, a screen space being defined between the outer casing and the screen for receiving a fraction which passes through the screen means for discharging a fraction remaining in the interior of the screen, an essentially vertically extending feed screw rotatably mounted within the interior of the screen, the feed screw comprising a shaft and a pulp conveying means, the feed screw having a periphery, further comprising a nozzle conduit extending substantially parallel to the shaft, means for supplying washing liquid to the nozzle conduit, the nozzle conduit comprising a plurality of perforations for spraying washing liquid on the screen and being mounted at the periphery of the feed screw adjacent the screen.

2. The apparatus according to claim 1, wherein the pulp conveying means comprises successively arranged sector-like blades, each blade having a leading edge and a trailing edge, the nozzle conduit being mounted in a gap located between the trailing edge of one blade and the leading edge of a subsequent blade.

3. The apparatus according to claim 1, wherein the pulp conveying means comprises a continuous thread, the continuous thread having an outer rim, the nozzle conduit being attached to the outer rim.

4. The apparatus according to claim 3, wherein then outer rim of the pulp conveying means has a recess, the nozzle conduit being located in the recess.

5. The apparatus according to claim 1, wherein the pulp conveying means comprises successively arranged sector-like blades, each blade having a leading edge and a trailing edge, wherein at least one of the leading edge and the trailing edge of successive blades has a recess, the nozzle conduit being located in the recess.

6. The apparatus according to claim 1, wherein the nozzle conduit has openings for spraying the washing liquid onto the screen surface.

7. The apparatus according to claim 6, wherein the openings are slots.

8. The apparatus according to claim 7, wherein the slots are arranged in at least two substantially axially extending rows.

9. The apparatus according to claim 6, wherein the openings are perforations.

10. The apparatus according to claim 9, wherein the perforations are arranged in at least two substantially axially extending rows.

11. The apparatus according to claim 1, wherein the nozzle conduit extends spirally over less than 360° in circumferential direction.

* * * * *